US010556370B2

(12) United States Patent
Hamada et al.

(10) Patent No.: US 10,556,370 B2
(45) Date of Patent: Feb. 11, 2020

(54) PARISON TRANSFER APPARATUS

(71) Applicant: TOYOTA JIDOSHA KABUSHIKI KAISHA, Toyota-shi, Aichi-ken (JP)

(72) Inventors: Takashi Hamada, Toyota (JP); Takuya Shimokawa, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 288 days.

(21) Appl. No.: 15/811,112

(22) Filed: Nov. 13, 2017

(65) Prior Publication Data

US 2018/0162032 A1 Jun. 14, 2018

(30) Foreign Application Priority Data

Dec. 8, 2016 (JP) ................................. 2016-238334

(51) Int. Cl.
| | |
|---|---|
| B29C 48/00 | (2019.01) |
| B29C 49/42 | (2006.01) |
| B29C 49/00 | (2006.01) |
| B29C 49/06 | (2006.01) |
| B29C 49/04 | (2006.01) |
| B29C 48/09 | (2019.01) |

(52) U.S. Cl.
CPC ........ B29C 48/0022 (2019.02); B29C 49/062 (2013.01); B29C 49/4247 (2013.01); *B29C 48/0017* (2019.02); *B29C 48/09* (2019.02); *B29C 49/04* (2013.01); *B29C 49/4205* (2013.01); *B29C 2793/0063* (2013.01)

(58) Field of Classification Search
CPC ............ B29C 48/0017; B29C 48/0022; B29C 49/0047; B29C 2049/0057; B29C 2049/0063; B29C 49/4247; B29C 49/4205

See application file for complete search history.

(56) References Cited

U.S. PATENT DOCUMENTS

2014/0113016 A1    4/2014    Ito et al.

FOREIGN PATENT DOCUMENTS

| JP | 61261021 A | * 11/1986 | ............ B29C 48/30 |
|---|---|---|---|
| JP | H06-218792 A | 8/1994 | |
| JP | 2002-120294 A | 4/2002 | |
| JP | 4295213 B2 | 7/2009 | |

(Continued)

OTHER PUBLICATIONS

Partial machine translation of JP 61-261021 A dated Nov. 1986 obtained from the espace website. (Year: 1986).*

*Primary Examiner* — Robert B Davis

(74) *Attorney, Agent, or Firm* — Oliff PLC

(57) ABSTRACT

A parison transfer apparatus includes a die core and at least two parison expansion rollers disposed below the die core and having a conical shape. The die core extrudes a parison having a form of a single sheet or cut into a plurality of sheets in an arc shape toward a space below the die core. The parison expansion rollers are arranged to abut against the vicinity of respective side end portions of the arc-shaped parison having the form of the single sheet or the plurality of sheets as a result of the cutting. The parison expansion rollers are configured to be rotated in a direction opposite to a downflow direction of the parison to pull the side end portion of the parison such that a width of the side end portion expands and a shape of the parison changes from the arc shape into a flat plate shape.

11 Claims, 7 Drawing Sheets

(56) References Cited

FOREIGN PATENT DOCUMENTS

| | | |
|---|---|---|
| JP | 2011-168064 A | 9/2011 |
| JP | 2012-240361 A | 12/2012 |
| WO | 2004/007183 A1 | 1/2004 |

* cited by examiner

PARISON TRANSFER APPARATUS

INCORPORATION BY REFERENCE

The disclosure of Japanese Patent Application No. 2016-238334 filed on Dec. 8, 2016 including the specification, drawings and abstract is incorporated herein by reference in its entirety.

BACKGROUND

1. Technical Field

The present disclosure relates to a parison transfer apparatus that is positioned below a die core for a blow molding machine for obtaining a blow molded article formed of a thermoplastic synthetic resin and that transfers a parison extruded from the die core after expanding the parison into a flat plate shape.

2. Description of Related Art

In the related art, metallic structures are used as hollow blow molded articles such as structures for fuel tanks for vehicles and the like. Those formed of a hollow thermoplastic synthetic resin are also used in the interest of vehicle weight reduction, rust prevention, easy molding into a desired shape, and so on.

When it comes to the manufacturing of a hollow product formed of a thermoplastic synthetic resin, a blow molding method is in wide use due to the ease of molding of a hollow body. By the blow molding method, the hollow body is manufactured with the parison of a molten thermoplastic synthetic resin member being given a cylindrical shape, the parison being extruded from above, the parison being pinched in a mold, and air being blown into the parison.

In this case, however, the air is blown into the parison after the parison is inflated by pre-blowing, and thus the molding cycle lengthens and productivity declines. Besides, the parison is pulled when the mold is clamped, and then the thickness of the parison have a variation, which causes the thickness of the wall of the hollow body to have a variation in some cases. As the case may be, interior components such as a baffle plate for suppressing the flowing sound of a fuel and valves need to be disposed in the blow molded article such as the fuel tank despite the blow molding method.

In this case, blow molding is performed with an interior component 110 inserted into a parison 2 that has a cylindrical shape. When the interior component 110 is large in size, a tip of the interior component 110 may come into contact with the inner surface of the cylindrical parison 2 during the molding of the interior component 110 held by a holding rod 141 in a blow molding mold 120 as illustrated in FIG. 7. Then, the tip of the interior component 110 may be stuck on or hurt the inner surface of the parison 2.

In this regard, the parison 2 extruded from a die core 210 is cut in a right-left direction by a cutting device 211 and the cut parisons 2 are divided into right and left ones and are given a sheet shape by a roll member 213 as illustrated in FIG. 8. Then, the parisons 2 are transported to a blow molding mold (not illustrated), and the cut parisons 2 are attached to right and left cavities of the blow molding mold by suctioning or the like. Subsequently, molding is performed with the interior component put between the right and left cavities and the blow molding mold blocked (refer to, for example, Japanese Patent No. 42955213).

In this case, a separator 311 is disposed in a die core 310 as means for cutting the parison 2 as illustrated in FIG. 9, a parison flow path 312 in the die core 310 is partially blocked by the separator 311, the parison 2 is halved and formed into a pair of sheets, and extrusion is performed (refer to, for example, Japanese Unexamined Patent Application Publication No. 2012-240361 (JP 2012-240361 A)). In this case, the separator 311 is pressed by a spring member 313, and thus the separator 311 may be increasingly consumed.

The cylindrical parison 2 extruded from a die core 410 is halved by a cutting blade 411 and the surface of a truncated cone-shaped deployment member 420 is spread by sliding of the arc-shaped parison 2 and taken by a guide roll 430 as illustrated in FIG. 10 (refer to, for example, Japanese Unexamined Patent Application Publication No. 6-218792 (JP 6-218792 A)). In this case, the temperature of the surface of the deployment member 420 abutting against the parison 2 is not controlled with ease. When the temperature of the surface of the deployment member 420 is extremely high, the releasability of the parison 2 declines. When the temperature of the surface of the deployment member 420 is extremely low, the temperature of the parison 2 falls and moldability declines.

SUMMARY

The disclosure provides a parison transfer apparatus transferring a parison with ease and in a flat plate shape from a die core to a space below the die core for a blow molding machine for obtaining a blow molded article with the parison having the form of a single sheet or cut into a plurality of sheets and extruded in an arc shape.

An aspect relates to a parison transfer apparatus including a die core for a blow molding machine for obtaining a blow molded article and at least two parison expansion rollers disposed below the die core. The die core is configured to extrude a parison having a form of a single sheet or cut into a plurality of sheets in an arc shape toward a space below the die core. At least two parison expansion rollers are disposed below the die core, the parison expansion rollers have a conical shape. The parison expansion rollers are arranged to abut against a vicinity of respective side end portions of the parison which is formed in the arc-shape, and which has the form of the single sheet or the plurality of sheets. The parison expansion rollers are configured to be rotated in a direction opposite to a downflow direction of the parison to pull the side end portion of the parison such that a width of the side end portion expands and a shape of the parison changes from the arc shape into a flat plate shape.

According to the aspect, the parison expansion rollers that have the conical shape are disposed below the die core in the parison transfer apparatus that transfers the parison which has the form of the single sheet or the plurality of sheets as a result of the cutting and is extruded in the arc shape from the die core to the space below the die core for the blow molding machine for obtaining the blow molded article. Accordingly, the arc-shaped parison can be expanded into the flat plate shape immediately after the extrusion of the parison.

The at least two parison expansion rollers are arranged to abut against the vicinity of the respective side end portions of the arc-shaped parison having the form of the single sheet or the plurality of sheets. Accordingly, the parison having the form of the single sheet or the plurality of sheets can be expanded into the flat plate shape by the respective side end portions of the arc-shaped parison having the form of the single sheet or the plurality of sheets being pulled by the at least two parison expansion rollers.

The parison expansion rollers are rotated in the direction opposite to the downflow direction of the parison to pull the side end portion of the parison such that the width of the side end portion of the parison expands and a shape of the parison changes from the arc shape into the flat plate shape. Accordingly, the side end portion of the parison can be pulled such that the width of the side end portion of the parison expands and the shape of the parison changes from the arc shape into the flat plate shape simply by the abutting of the parison expansion roller against the parison and the rotation of the parison expansion roller in the direction that is opposite to the downflow direction of the parison.

In the parison transfer apparatus according to the aspect, the parison expansion rollers may abut against parts of the parison with a length of 30 cm to 50 cm from both side ends of the parison.

According to the aspect, the parison expansion rollers abut against the parts of the parison with a length of 30 cm to 50 cm from the both side ends of the parison. Accordingly, the parison expansion rollers are capable of reliably abutting against the both side ends of the parison, the width of the side end portion of the parison can be expanded, the side end portion of the parison can be pulled and the shape of the parison can change from the arc shape into the flat plate shape. The parts of the parison with a length of 30 cm to 50 cm from the both side ends of the parison correspond to burr parts of the blow molded article during blow molding even when the parts of the parison with a length of 30 cm to 50 cm from the both side ends of the parison are pulled and expanded, and thus the parts with a length of 30 cm to 50 cm from the both side ends of the parison do not reduce the thickness of the blow molded article.

In the parison transfer apparatus according to the aspect, the parison expansion rollers are provided such that an axis of each of the parison expansion rollers is inclined with respect to the downflow direction of the parison.

According to the aspect, the parison expansion rollers abut the side end portion of the parison at an angle inclined with respect to the downflow direction of the parison. Accordingly, the width of the side end portion of the parison can be expanded and the side end portion of the parison can be pulled in a continuous and smooth manner, without the downflow of the parison being hindered, by the conical parison expansion rollers rotating.

In the parison transfer apparatus according to the aspect, the parison expansion rollers may be provided such that the axis of each of the parison expansion rollers is at an angle of 30 degrees to 40 degrees with respect to the downflow direction of the parison.

The parison transfer apparatus according to the aspect may further include at least two guide rollers abutting against respective inner surfaces of the parisons which are transferred from the parison expansion rollers, the at least two guide rollers transferring the parisons, the guide rollers having a columnar shape, and a guide roller holding member attached to each of the guide rollers. The guide rollers may have a columnar shape and the guide rollers may be configured to be moved in directions away from each other by the guide roller holding members revolving such that the plurality of the parisons move in the directions away from each other in an early stage in which the parison is extruded.

According to the aspect, the parison transferred from the parison expansion rollers is transferred by each of the columnar guide rollers and the at least two guide rollers abut against the respective inner surfaces of the parison. Accordingly, the parisons transferred from the parison expansion rollers can be guided in the directions away from each other to prevent the parisons from being in contact to each other Each of the guide rollers is attached to the guide roller holding member. The guide rollers are attached such that the guide rollers can be moved in the directions away from each other by the guide roller holding members revolving and the parisons can be moved in the directions away from each other in the early stage in which the parison is extruded.

Accordingly, each of the parisons can be automatically moved to a position where the parison can be transferred by the guide roller simply by the revolution of the guide roller holding member in the early stage in which the parison is extruded. Accordingly, the extrusion of the parison can be expedited, without the heated parison being touched, in the early stage in which the parison is extruded.

In the parison transfer apparatus according to the aspect, the guide rollers may include a first guide roller abutting against the inner surface of the parison and a second guide roller abutting against an outer surface of the parison.

According to the aspect, the guide rollers include the first guide roller abutting against the inner surface of the parison and the second guide roller abutting against the outer surface of the parison. Accordingly, the parison can be pinched by the first guide roller abutting against the inner surface of the parison and the second guide roller abutting against the outer surface of the parison and the transfer speed of the parison can be controlled.

In the parison transfer apparatus according to the aspect, the first guide roller and the second guide roller may rotate in opposite directions.

In the parison transfer apparatus according to the aspect, the guide rollers may have fine unevenness on surfaces and may be coated with a non-adhesive material.

According to the aspect, the guide rollers have the fine unevenness on the surfaces and are coated with the non-adhesive material. Accordingly, releasability with respect to the guide rollers is improved and the force of the guide rollers to grip the parison is increased even when the parison has a high temperature. As a result, the guide rollers are capable of controlling the parison transfer speed over an extended range.

The parison transfer apparatus according to the aspect may further include a parison speed sensor configured to detect a movement speed of the parison and the rotation of the guide rollers may be controlled based on the movement of the parison detected by the parison speed sensor.

According to the aspect, the parison speed sensor configured to detect the movement speed of the parison is further disposed and the rotation of the guide rollers is controlled based on the movement speed of the parison detected by the parison speed sensor. Accordingly, a uniform thickness can be achieved by the wrinkles and pulling of the parison or its deflection being reduced from the usual based on the control of the rotation of the guide rollers in accordance with the extrusion speed of the parison.

The parison transfer apparatus according to the aspect may further include a laser sensor configured to detect a tension or a deflection of the parison and the rotation of the guide rollers may be controlled based on a degree of the tension or the deflection of the parison detected by the laser sensor.

According to the aspect, the laser sensor configured to detect a tension or a deflection of the parison is further disposed and the rotation of the guide rollers is controlled based on a degree of the tension or the deflection of the parison detected by the laser sensor. Accordingly, the tension or deflection of the parison can be within a predetermined range, the tension of the parison can be eliminated, and the uniform thickness can be achieved by the deviation between the amount of the deflection of the parison and a reference point being detected and the rotation of the guide rollers being controlled.

The parison transfer apparatus according to the aspect may further include a parison speed sensor configured to detect a movement speed of the parison and a laser sensor configured to detect a deflection of the parison and the rotation of the guide rollers may be controlled based on the movement speed detected by the parison speed sensor and the deflection of the parison detected by the laser sensor.

According to the aspect, the parison speed sensor configured to detect the movement speed of the parison and the laser sensor configured to detect the deflection of the parison are further disposed and the rotation of the guide rollers is controlled based on the movement speed detected by the parison speed sensor and the deflection of the parison detected by the laser sensor. Accordingly, a uniform thickness can be achieved by the wrinkles and pulling of the parison or its deflection being reduced from the usual based on the control of the rotation of the guide rollers in accordance with the extrusion speed of the parison and the deflection of the parison.

According to the aspect, the at least two parison expansion rollers are arranged to abut against the vicinity of the respective side end portions of the arc-shaped parison having the form of the single sheet or the plurality of sheets. Accordingly, the arc-shaped parison can be expanded into the flat plate shape by the respective side end portions of the parison having the form of the single sheet or the plurality of sheets being pulled by the at least two parison expansion rollers. The parison expansion rollers are rotated in the direction opposite to the downflow direction of the parison to pull the side end portion of the parison such that the width of the side end portion of the parison expands and the shape of the parison changes from the arc shape into the flat plate shape. Accordingly, the side end portion of the parison can be pulled such that the width of the side end portion of the parison expands and the shape of the parison changes into the flat plate shape simply by the abutting of the parison expansion roller against the parison.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
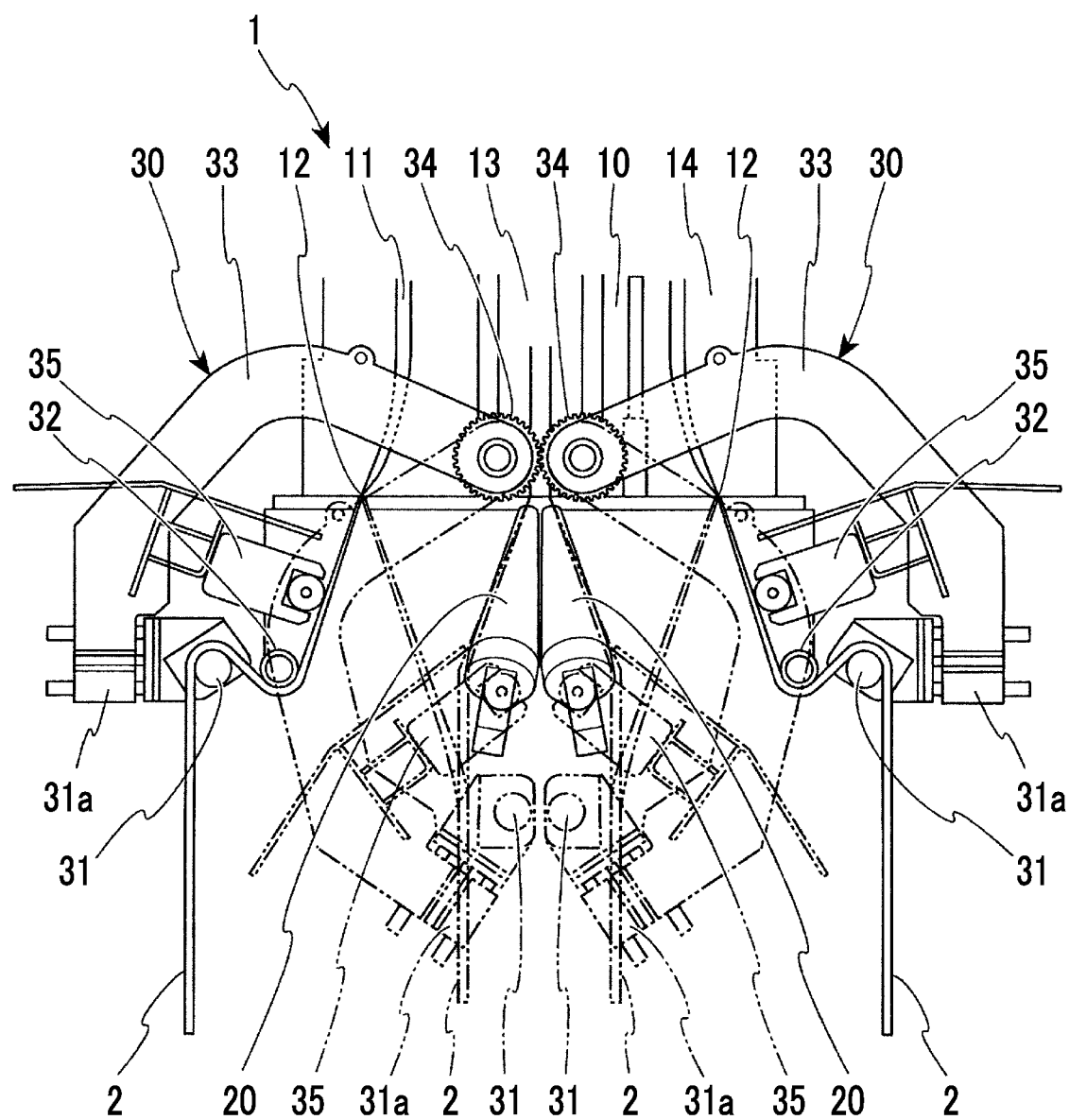
FIG. 1 is a front view of a parison transfer apparatus according to an embodiment to which parison expansion rollers and guide rollers are attached.

A parison transfer apparatus 1 for a blow molding machine according to an embodiment will be described based on FIGS. 1 to 6. As illustrated in FIG. 1, the parison transfer apparatus 1 has a die core 10, parison expansion rollers 20, and parison guide members 30. Manufacturing of each of the die core 10, the parison expansion roller 20, and the parison guide member 30 will be described first, and then a movement related to transferring a parison 2 will be described.

Figure 2:
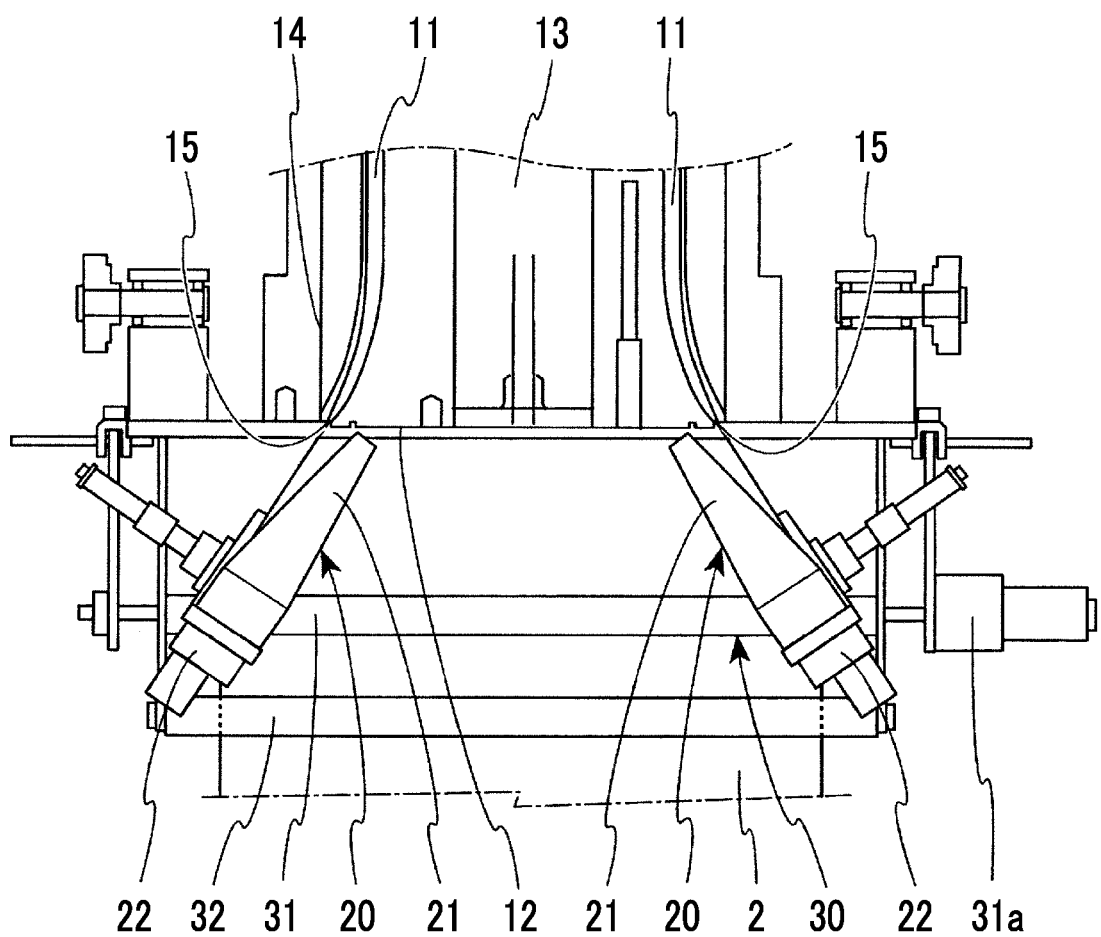
FIG. 2 is a front view of parts of the parison transfer apparatus according to the embodiment to which the parison expansion rollers are attached.

As illustrated in FIGS. 1 and 2, the die core 10 has a die core main body 13 formed in a columnar shape and a die core outer tube 14 surrounding the die core main body 13. A parison flow path 11 is formed between the die core main body 13 and the die core outer tube 14, and the parison 2 flows through the parison flow path 11 after the parison 2 is extruded from an extruder. A parison outlet 12 is formed at an outlet of the parison flow path 11. The parison 2 flows down from the parison outlet 12.

Outlet-blocked parison cutting units 15 are formed in two places of the parison outlet 12. The parison cutting units 15 are formed at 180 degrees apart from each other. Accordingly, the parison 2 coming out of the parison outlet 12 is cut by the parison cutting units 15, and then the parison 2 comes out of the die core 10 after being extruded in the form of two sheets having a semi-cylindrical shape. The parison cutting units 15 are capable of cutting the parison 2 in the die core 10 and extruding the two parisons 2 having a cylindrical shape by a parison blocking member being attached to the parison outlet 12. In the present embodiment, the parison 2 is extruded in the form of two sheets. However, the parison 2 can also be extruded in a cylindrical shape and cut in one place for the number of sheets to be one or for the parison 2 to turn into a plurality of, at least three to be specific, sheets.

Figure 3:
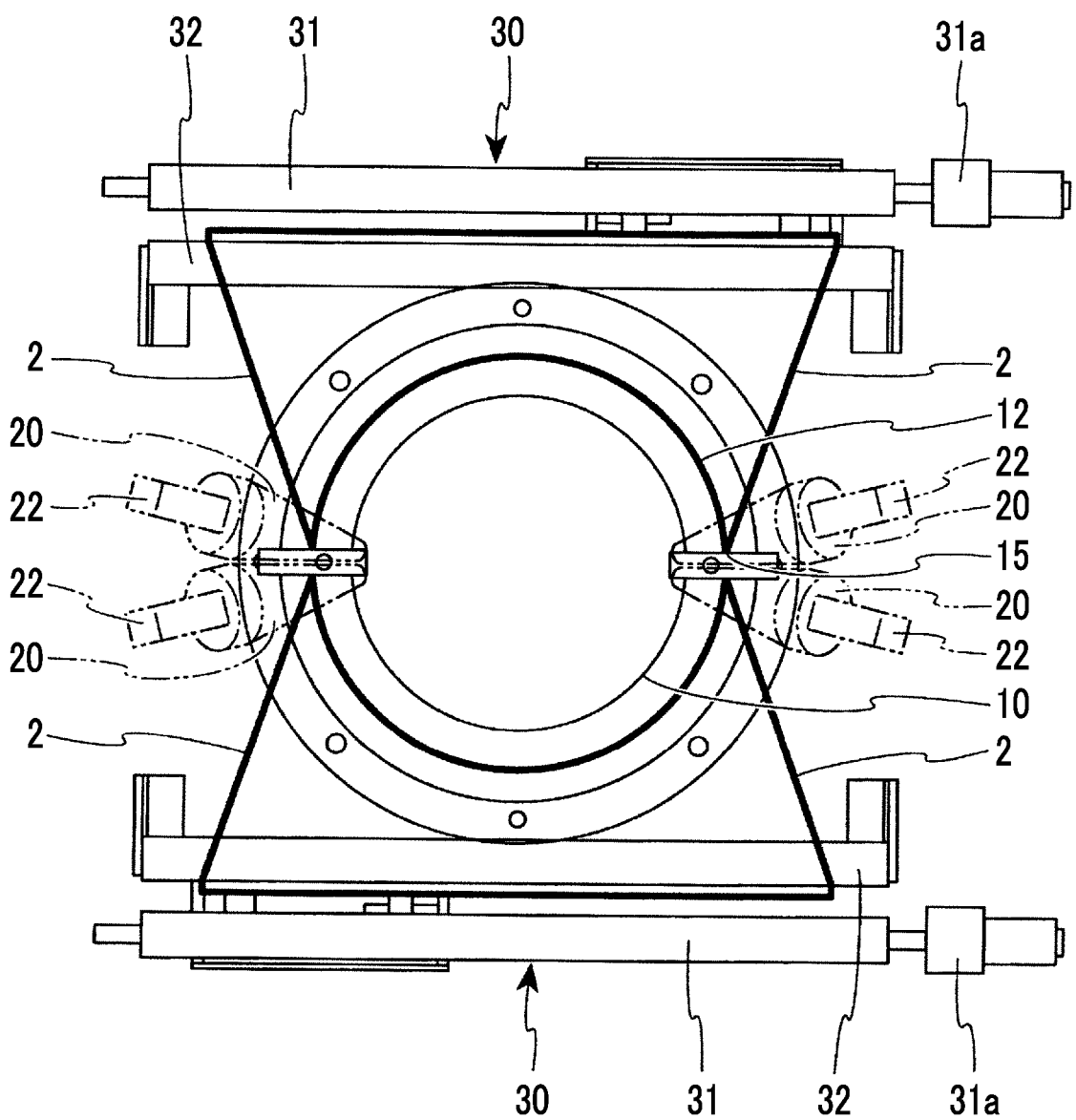
FIG. 3 is a plan view of the parison transfer apparatus according to the embodiment to which the parison expansion rollers and the guide rollers are attached.

The parison expansion roller 20 will be described below. As illustrated in FIGS. 2 and 3, the parison expansion roller 20 is formed in a conical shape and its conical surface forms a parison expansion roller conical surface 21. A parison expansion roller servomotor 22 is attached to a bottom portion of the parison expansion roller 20 and rotates the parison expansion roller 20.

Figure 4:
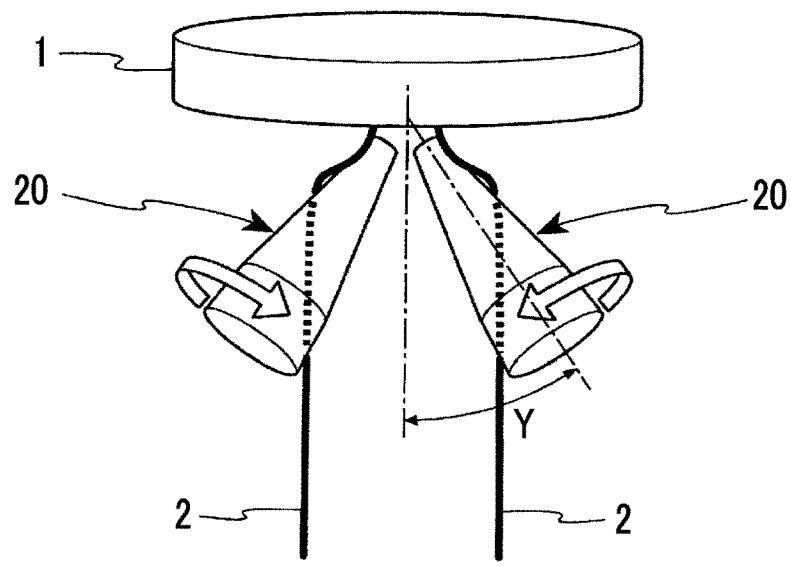
FIG. 4 is a schematic diagram illustrating a movement of the parison expansion rollers in the parison transfer apparatus according to the embodiment to pull and expand a parison.
Figure 5:
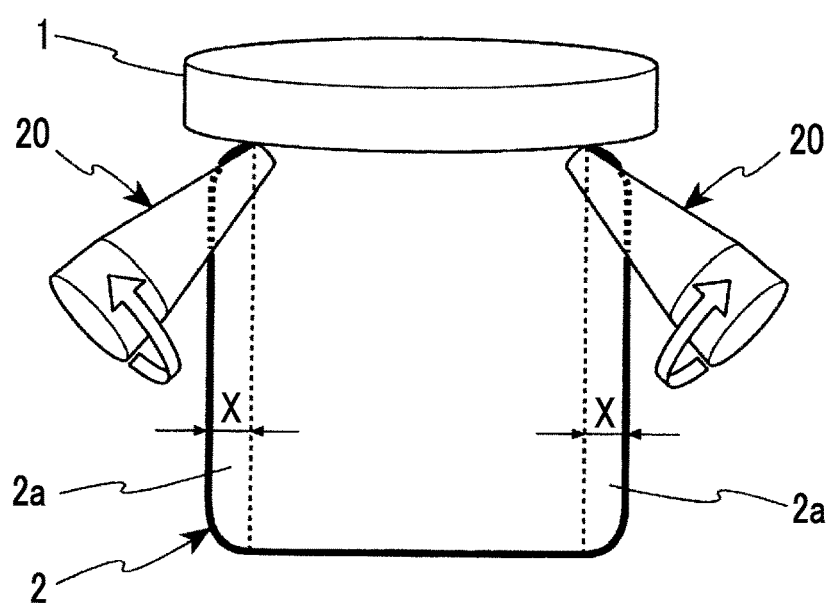
FIG. 5 is a schematic diagram illustrating a movement of the parison expansion rollers in the parison transfer apparatus according to the embodiment to pull and expand the parison with the parison expansion rollers abutting against side end portions of the parison.

The four parison expansion rollers 20 are disposed such that the parison expansion roller 20 abuts against the vicinity of a parison side end portion 2a of each of the two arc-shaped parisons 2 resulting from the extrusion from the die core 10 and the cutting. In other words, the four parison expansion rollers 20 are disposed such that the four parison expansion rollers 20 abut against the four parison side end portions 2a of the two arc-shaped parisons 2 as illustrated in FIGS. 4 and 5. In a case where the parison 2 is a single sheet, the number of the parison expansion rollers 20 that are used is two. In a case where the parison 2 has the form of at least three sheets, the number of the parison expansion rollers 20 that are used is twice the number of the sheets.

As illustrated in FIGS. 4 and 5, the parison expansion roller 20 is attached such that the direction of its rotation is opposite to the downflow direction of the parison 2. As a result, pulling is performed for the width of the parison side end portion 2a of the parison 2 to be expanded and expansion is performed for the shape of the parison 2 to turn from the arc shape into a flat plate shape. Accordingly, the pulling can be performed for the width of the parison side end portion 2a to be expanded and the expansion can be performed for the shape of the parison 2 to turn from the arc shape into the flat plate shape in a continuous manner simply by the abutting of the parison expansion roller 20 against the parison 2 and the rotation in the direction that is opposite to the downflow direction of the parison 2.

Preferably, the width of the parison side end portion 2a against which the parison expansion roller 20 abuts (indicated by X in FIG. 5) is equivalent to the part that has a length of 30 cm to 50 cm from its end portion. Once the parison expansion roller 20 abuts against the part of the parison side end portion 2a that has a length of 30 cm to 50 cm, the parison expansion roller 20 is capable of reliably abutting against the parison 2, the width of the parison side end portion 2a can be expanded, the pulling can be performed, and the shape of the parison 2 can turn from the arc shape into the flat plate shape. The part of the parison side end portion 2a that has a length of 30 cm to 50 cm corresponds to a burr part of a blow molded article even when its thickness decreases, and thus does not reduce the thickness of the blow molded article.

Preferably, the parison expansion roller 20 abuts at an angle to the downflow direction of the parison 2 as illustrated in FIG. 4. In this case, the width of the parison side end portion 2a can be expanded and the pulling can be performed with respect to the parison 2 that flows down by the conical parison expansion roller 20 rotating. The parison expansion roller 20 is at an angle of approximately 30 degrees to 40 degrees to the downflow direction of the parison 2 (as illustrated by Y in FIG. 4).

As illustrated in FIGS. 1 to 3, the parison guide members 30 are disposed below the parison expansion rollers 20. The two parison guide members 30 are disposed across the parison expansion rollers 20. Each of the parison guide members 30 has a first guide roller 31 abutting against the inner surface of the parison 2 and a second guide roller 32 abutting against the outer surface of the parison 2. Each of the parison guide members 30 also has a first guide roller holding member 33 and a first guide roller holding member revolving gear 34. The first guide roller holding member 33 is curved in a dogleg shape with the first guide roller 31 attached to a first tip of the first guide roller holding member 33. The first guide roller holding member revolving gear 34 is attached to a second tip of the first guide roller holding member 33.

As illustrated in FIG. 1, the first guide roller holding member revolving gear 34 is attached near the parison outlet 12 of the die core 10 to be capable of revolving horizontally. Once the first guide roller holding member revolving gears 34 revolve, the tips of the first guide roller holding members 33 and the first guide rollers 31 revolve toward the outside in directions away from each other.

Then, the first guide roller 31 attached to the first guide roller holding member 33 revolves while maintaining the abutting of the first guide roller 31 against the inner surface of the parison 2. The revolution of the first guide roller 31 stops at a position where the outer surface of the parison 2 abuts against the second guide roller 32 or a position where the parison 2 is held in the shape of an S between the first guide roller 31 and the second guide roller 32. In this state, extrusion of the parison 2 can continue, and the parison 2 can be transferred as described below.

In other words, the parison 2 is extruded to a space below the first guide roller 31 in the early stage of the extrusion of the parison 2. Then, the first guide roller holding member 33 revolves by the first guide roller 31 abutting against the inner surface of the parison 2 extruded from the die core 10 and the first guide rollers 31 are moved in the directions away from each other with the parison 2 held. The first guide rollers 31 are attached such that the two parisons 2 resulting from the cutting can be moved in the directions away from each other.

Figure 6:
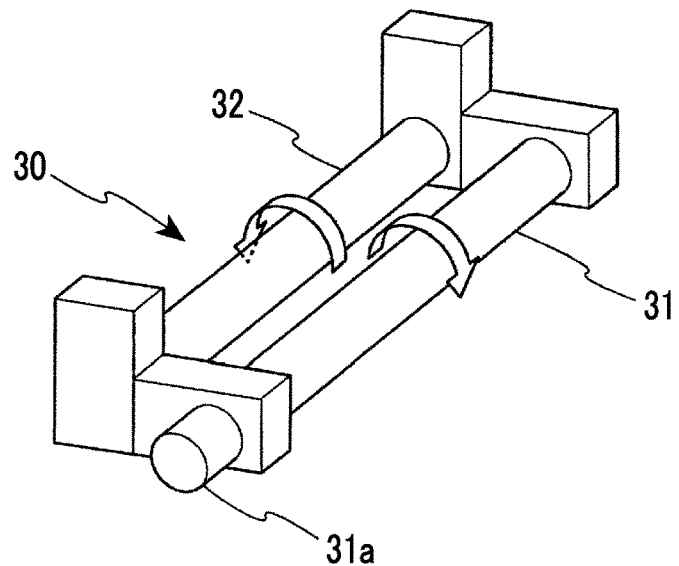
FIG. 6 is a schematic diagram illustrating a movement of the two guide rollers used in the parison transfer apparatus according to the embodiment.
Figure 7:
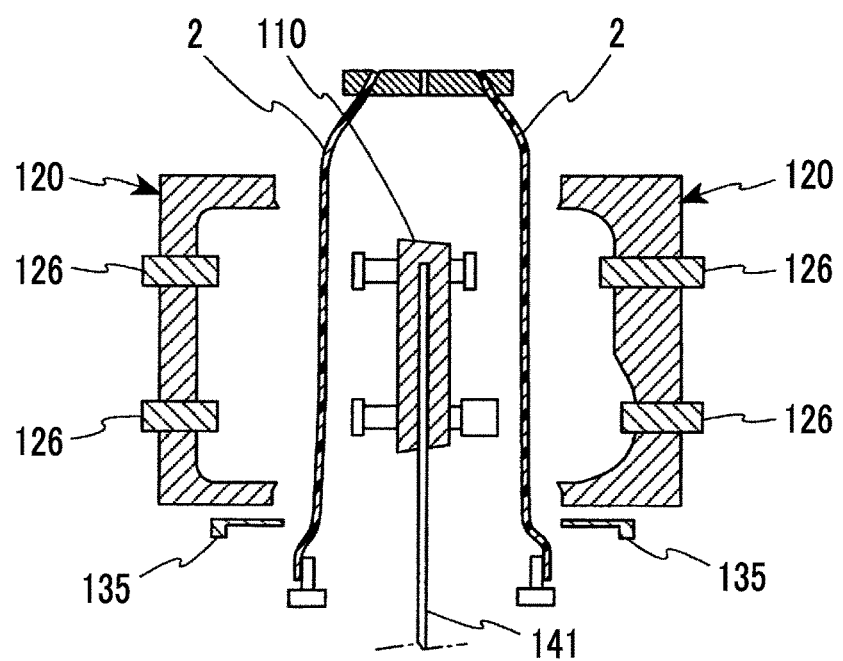
FIG. 7 is a sectional view of a process for manufacturing a blow molded article with a blow molding apparatus according to the related art, which shows a state where a parison is inside a blow molding mold.
Figure 8:
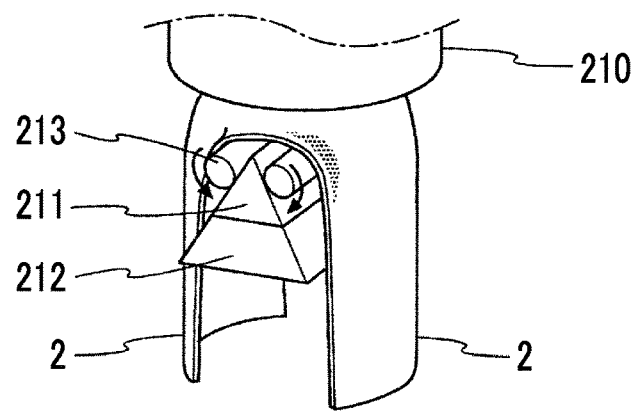
FIG. 8 is a perspective view of a parison cutting blade part of a parison transfer apparatus in a state where another parison cutting unit according to the related art cuts the parison in a right-left direction.
Figure 9:
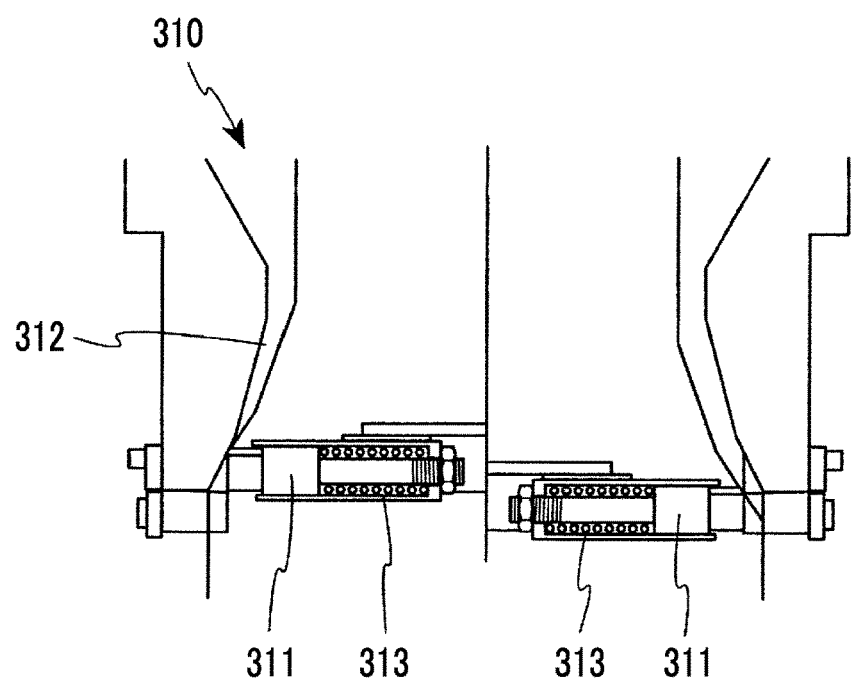
FIG. 9 is a sectional view of a cut part of the parison in another die core according to the related art.
Figure 10:
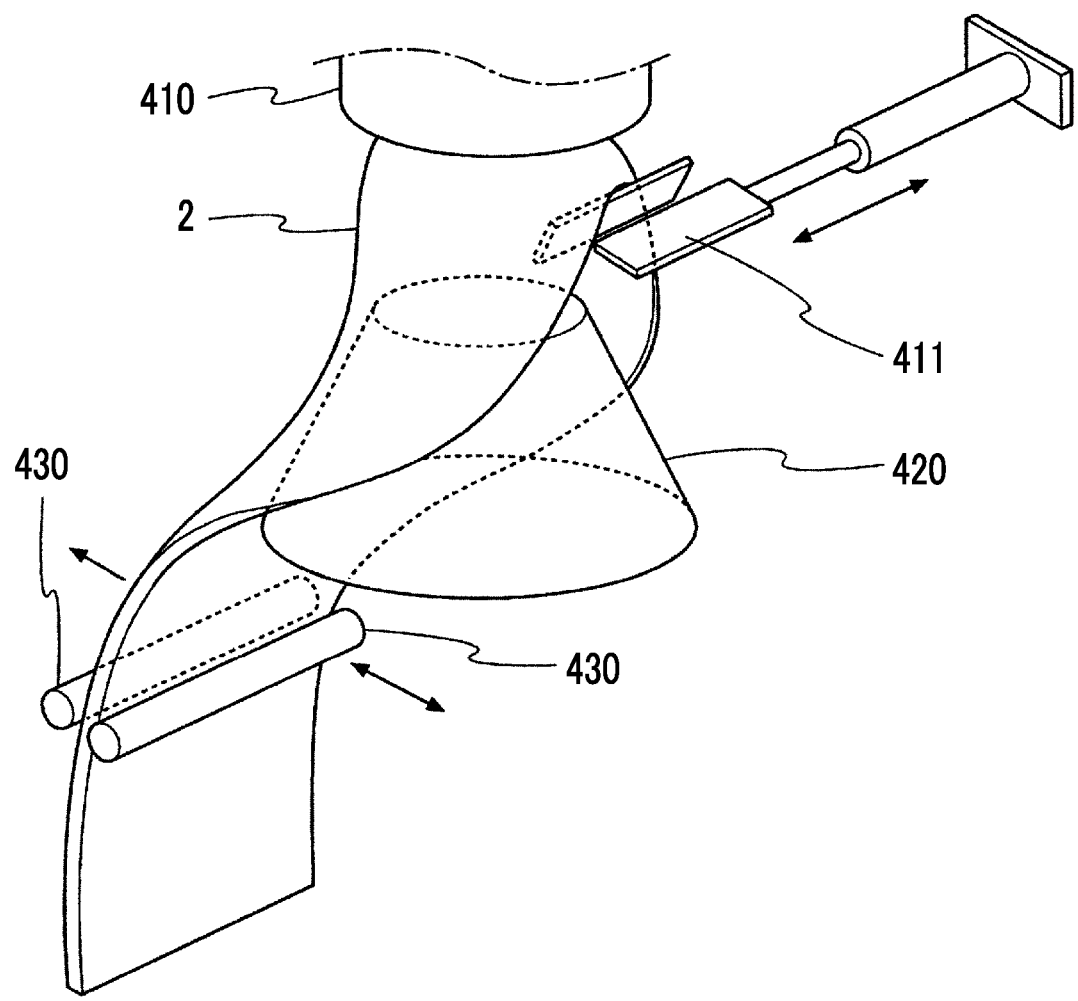
FIG. 10 is a perspective view of a part cutting the parison extruded from another die core according to the related art and spreading the parison in a flat plate shape.

The first guide roller 31 can be driven to rotate by a first guide roller servomotor 31a. A state where the first guide roller 31 and the second guide roller 32 are in close proximity to each other is illustrated in FIG. 6. As illustrated in FIG. 6, the first guide roller 31 and the second guide roller 32 rotate in opposite directions. Accordingly, the parison 2 can be transferred by the parison 2 passing between the first guide roller 31 and the second guide roller 32 as illustrated in FIG. 1.

A parison speed sensor 35 can be disposed for the movement speed of the parison 2 to be measured. In this case, the extrusion speed of the parison 2 and the transfer speed of the parison 2 are measured with the parison speed sensor 35 abutting against the parison 2 or the parison speed sensor 35 and the parison 2 not in contact with each other. The movement speed of the parison 2 detected by the above-described measurement being higher than a prescribed speed means that the parison 2 is deflected. The rotation of the first guide roller 31 is controlled based on the tension and deflection conditions of the parison 2 measured by the parison speed sensor 35. Accordingly, a uniform thickness can be achieved by the wrinkles and pulling of the parison 2 or its deflection being reduced from the usual based on the control of the rotation of the first guide roller 31 in accordance with the extrusion speed of the parison 2 and the tension and deflection conditions of the parison 2.

The tension and deflection conditions of the parison 2 can also be measured by a distance laser sensor being disposed near the parison expansion roller 20. The rotation of the first guide roller 31 is controlled based on the amount of the deflection of the parison 2 measured by the distance laser sensor and the deviation between the amount of the deflection and a reference point that is measured. The parison speed sensor 35 and the distance laser sensor can be used in combination with each other. Alternatively, merely one of the parison speed sensor 35 and the distance laser sensor can be used as well.

The first guide roller 31 and the second guide roller 32 can have fine unevenness on their surfaces and be coated with a non-adhesive material. In this case, releasability with respect to the first guide roller 31 and the second guide roller 32 is improved and the force of the first guide roller 31 and the second guide roller 32 to grip the parison 2 is increased even when the parison 2 with a high temperature comes into contact with the first guide roller 31 or the second guide roller 32. As a result, the first guide roller 31 is capable of controlling the parison transfer speed over an extended range.

The movement of the parison transfer apparatus 1 will be described below. Firstly, the parison 2 is extruded from the parison outlet 12 of the die core 10. At this time, the parison 2 is extruded in the form of the two cut sheets that have the semi-cylindrical shape by the parison cutting units 15 of the die core 10. At this time, the parison expansion rollers 20 abut against the parison side end portions 2a of the two parisons 2 resulting from the cutting as illustrated in FIG. 5. The two parisons 2 resulting from the cutting have the four parison side end portions 2a. The four parison expansion rollers 20 respectively abut against the four parison side end portions 2a.

The parison expansion roller 20 rotates at a high speed in the direction that is opposite to the downflow direction of the parison 2. Accordingly, the parison side end portion 2a is pulled and extended with the parison expansion roller conical surface 21 abutting and the semi-cylindrical parison 2 is deployed into the flat plate shape. After the deployment, the parison 2 flows down with the two sheets in parallel to each other and across the two first guide roller holding members 33 as illustrated in FIG. 1.

Once the parison 2 flows down in the form of the two sheets, the first guide roller holding member revolving gears 34 of the parison guide members 30 revolve, and the tips of the first guide roller holding members 33 are moved to be opened to the outside as illustrated in FIG. 1. Then, the two first guide rollers 31 move the two parisons 2 resulting from the cutting in the directions away from each other while maintaining the abutting of the two first guide rollers 31 against the inner surfaces of the parisons 2. Accordingly, the two parisons 2 are capable of flowing down without coming into contact with each other.

The first guide roller holding members 33 revolve while causing the first guide rollers 31 to abut against the inner surfaces of the parisons 2 and the revolution stops at the position where the outer surface of the parison 2 abuts against the second guide roller 32. Then, the parison 2 passes in the shape of an S between the first guide roller 31 and the second guide roller 32 as illustrated in FIG. 1.

Accordingly, the parison 2 can be automatically moved, with each of the two parisons 2 positioned to be interposed between the first guide roller 31 and the second guide roller 32, simply by the revolution of the first guide roller holding member 33 in the early stage of the extrusion of the parison 2. Accordingly, the extrusion can be expedited, without the heated parison 2 being touched, in the early stage of the extrusion of the parison 2.

As the extrusion of the parison 2 further continues, the parison expansion roller 20 continues to abut against the parison side end portion 2a, the shape of the parison 2 turns from the cylindrical shape into the flat plate shape, and the downflow continues. Then, the parison 2 can be transferred by the first guide roller 31 and the second guide roller 32 further rotating. At this time, the parison speed sensor 35 detects the transfer speed of the parison 2, and the rotation of the first guide roller 31 is controlled based on the measurement by the parison speed sensor 35. Accordingly, the uniform thickness can be achieved by the wrinkles and pulling of the parison 2 being reduced from the usual based on the control of the rotation of the first guide roller 31 performed by the first guide roller servomotor 31a in accordance with the extrusion speed of the parison 2.

Once the downflow of the parison 2 reaches a predetermined length, the upper portion of the parison 2 is pinched and cut by a cutter (not illustrated). After the cutting at the predetermined length, the parison 2 is transported by a robot arm to a position where a blow molding mold (not illustrated) is. During the cutting of the parison 2, the parison 2 can be pinched by the first guide roller 31 and the second guide roller 32. After cutting in a right-left direction, the parisons 2 are transferred to right and left open cavity parts of the blow molding mold and suctioned into and attached to the respective cavities. Then, an interior component is put between the cavities, the cavities are blocked, and blow molding is performed for the blow molded article to be obtained.

What is claimed is:

1. A parison transfer apparatus comprising:
    a die core for a blow molding machine for obtaining a blow molded article, the die core being configured to extrude a parison, which has a form of a single sheet or a plurality of sheets as a result of cutting, and which is in an arc shape toward a space below the die core; and
    at least two parison expansion rollers disposed below the die core, the parison expansion rollers having a conical shape, wherein:
    the parison expansion rollers are arranged to abut against a vicinity of respective side end portions of the parison which is formed in the arc-shape, and which has the form of the single sheet or the plurality of sheets; and
    the parison expansion rollers are configured to be rotated in a direction opposite to a downflow direction of the parison to pull the side end portion of the parison such that a width of the side end portion expands and a shape of the parison changes from the arc shape into a flat plate shape.

2. The parison transfer apparatus according to claim 1, wherein the parison expansion rollers abut against parts of the parison with a length of 30 cm to 50 cm from both side ends of the parison.

3. The parison transfer apparatus according to claim 1, wherein the parison expansion rollers are provided such that an axis of each of the parison expansion rollers is inclined with respect to the downflow direction of the parison.

4. The parison transfer apparatus according to claim 3, wherein the parison expansion rollers are provided such that the axis of each of the parison expansion rollers is at an angle of 30 degrees to 40 degrees with respect to the downflow direction of the parison.

5. The parison transfer apparatus according to claim 1, further comprising:
    at least two guide rollers abutting against respective inner surfaces of the parisons which are transferred from the parison expansion rollers, the at least two guide rollers transferring the parisons, the guide rollers having a columnar shape; and
    a guide roller holding member attached to each of the guide rollers,
    wherein the guide rollers are configured to be moved in directions away from each other by the guide roller holding members revolving such that a plurality of the parisons move in the directions away from each other in an early stage in which the parison is extruded.

6. The parison transfer apparatus according to claim 5, wherein the at least two guide rollers include a first guide roller abutting against the inner surface of the parison and a second guide roller abutting against an outer surface of the parison.

7. The parison transfer apparatus according to claim 6, wherein the first guide roller and the second guide roller rotate in opposite directions.

8. The parison transfer apparatus according to claim 5, wherein the guide rollers have fine unevenness on surfaces and are coated with a non-adhesive material.

9. The parison transfer apparatus according to claim 5, further comprising a parison speed sensor configured to detect a movement speed of the parison,
- wherein the rotation of the guide rollers is controlled based on the movement speed of the parison detected by the parison speed sensor.

10. The parison transfer apparatus according to claim 5, further comprising a laser sensor configured to detect a tension or a deflection of the parison,
- wherein the rotation of the guide rollers is controlled based on a degree of the tension or the deflection of the parison detected by the laser sensor.

11. The parison transfer apparatus according to claim 5, further comprising:
- a parison speed sensor configured to detect a movement speed of the parison; and
- a laser sensor configured to detect a deflection of the parison,
- wherein the rotation of the guide rollers is controlled based on the movement speed of the parison detected by the parison speed sensor and the deflection of the parison detected by the laser sensor.

\* \* \* \* \*